United States Patent [19]
Crouse

[11] 4,190,767
[45] Feb. 26, 1980

[54] OPTICAL ENCODER APPARATUS

[75] Inventor: Ronald J. Crouse, McKinney, Tex.

[73] Assignee: TRW Inc., Los Angeles, Calif.

[21] Appl. No.: 919,394

[22] Filed: Jun. 26, 1978

[51] Int. Cl.² .............................................. G01D 5/34
[52] U.S. Cl. ............................ 250/231 SE; 250/239
[58] Field of Search ............ 250/211 K, 229, 231 SE, 250/239; 324/175

[56] References Cited
U.S. PATENT DOCUMENTS

| | | | |
|---|---|---|---|
| 3,234,394 | 2/1966 | Worden | 250/231 SE |
| 3,702,070 | 11/1972 | Gartner | 250/229 |

*Primary Examiner*—David C. Nelms
*Attorney, Agent, or Firm*—Jack A. Kanz

[57] ABSTRACT

Disclosed is an encoder assembly employing a single radiant energy source mounted oppositely disposed from two sensors. A shutter having two distinct leading edges is mounted for movement between the source and the sensors. One edge is aligned to interrupt the optical path between the source and one sensor and the other edge is aligned to interrupt the path between the source and the other sensor. The housing for mounting the sensors includes narrow optical apertures to provide sharp signal cut-off and widened slots below the apertures to prevent wicking of potting material into the optical apertures.

7 Claims, 4 Drawing Figures

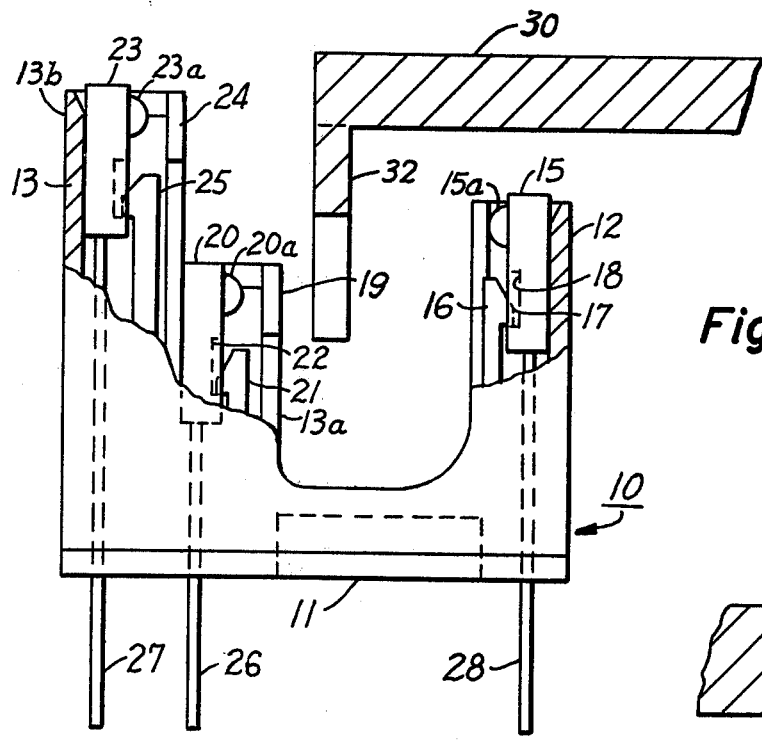
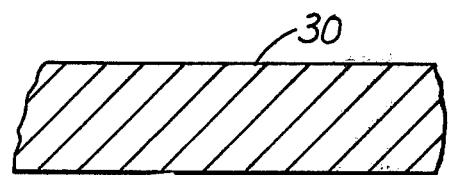
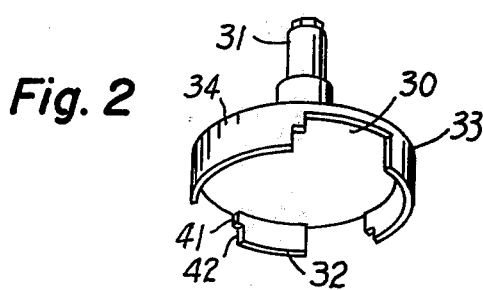
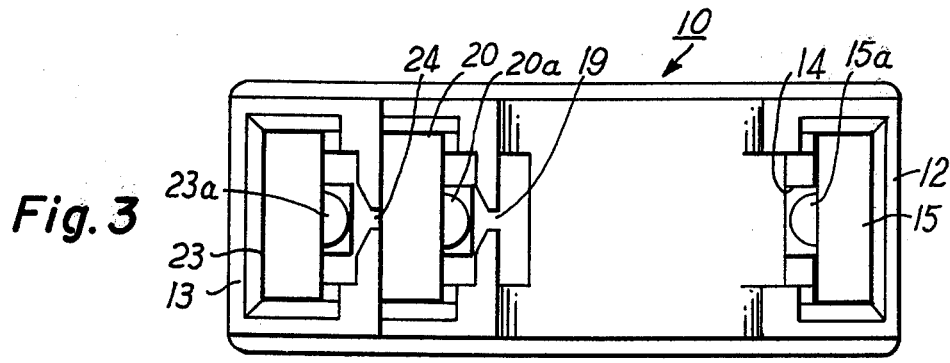
Fig. 1
Fig. 2
Fig. 4
Fig. 3

OPTICAL ENCODER APPARATUS

This invention relates to optical encoder apparatus. More particularly it relates to position determining apparatus using an optical encoder to determine relative position of one body with respect to another.

Various encoder systems are currently used wherein the relative movement of one body with respect to another body is determined by movement of a shutter moved by the first body to interrupt the optical path between a radiant energy source and sensor mounted on a second body fixed relative to the first body. Typical of such system is an optical encoder apparatus used to determine the relative position of an automotive vehicular body with respect to the axle housing or the like. Signals produced by the apparatus may be used to control apparatus for maintaining the body at a relatively constant elevation with respect to the axle regardless of load. Conventionally, a sensor station is affixed to the vehicle body. The sensor station contains a radiant energy source spaced from a sensor device responsive to the radiant energy emitted by the source. A small gap is provided between the sensor and source so that radiant energy emitted by the source may impinge directly on the sensor and produce an electrical signal. A shutter or encoder wheel is positioned in spaced relation with the sensor station and adapted for rotational movement about its axis. The shutter wheel is mechanically linked to the axle housing so that relative vertical movement of the axle housing with respect to the vehicular body is translated to rotational movement of the encoder wheel. A shutter flange depending from the encoder wheel moves in the gap between the sensor and emitter to interrupt the optical path. Loss of optical signal thus indicates a pre-selected limit of movement of the body with respect to the axle housing, thus the absence or presence of signal may be used as a digital signal to activate or control a suitable compensation system to raise or lower the body with respect to the axle housing.

Conventionally, a pair of emitter and sensor pairs are utilized and the encoder wheel has a pair of depending flanges; one used determine the upper limit and the other used determine the lower limit of permissible relative vertical movement of the body with respect to the axle housing. Each emitter and sensor pair thus may generate one channel of digital information.

Various problems are frequency encountered in use of the encoder system described above. For example, even though the shutters may depend from the same encoder wheel, the housing supporting each emitter and sensor pair must be individually adjusted to position the sensor station so that the desired relative movement between upper limit and lower limit may occur since separate emitter and sensor pairs are used for determining the upper and lower limits. Accordingly, each sensor station assembly must be individually adjusted for each installation. Furthermore, a separate emitter and sensor is required for each sensor station.

Since the encoder apparatus is used to determine relative movement between the axle housing and a vehicular body, the assembly is subjected to a rather harsh environment. Accordingly, in most conventional installations it is preferable that the electronic devices be rigidly and permanently secured within the mounting means and the mounting means protected with a suitable enclosure. Therefore, once the opto-electronic devices have been properly aligned, they may not move out of alignment within the mounting housing. For this purpose, the optical devices are usually secured to the mounting housing by an epoxy resin or the like. Difficulties have been encountered in the past with the epoxy resin normally used since the epoxy is applied in liquid form and tends to climb by capillary action into and obscure the optical apertures of the housing, thus rendering the assembly unusable.

In accordance with the present invention, separate alignment of the upper and lower movement limits is eliminated by utilizing a single radiant energy source and a pair of radiant energy sensors positioned in the same mounting housing; one to determine upper limit and the other to determine lower limit. A single shutter movable between three positions is employed. Since the position of the sensors with respect to the single source is fixed, and the relative movement represented by each position of the shutter is fixed, alignment of the shutter to determine the upper or lower limit automatically fixes the other limit. In this manner manual adjustment to determine both upper and lower limits is eliminated. The mounting housing is also specially adapted with a spring retainer to maintain the electronic devices within the mounting housing and provided with a widened gap below the aperture to prevent wicking of the potting material into the optical aperture. As an added convenience, a single shutter wheel may include a plurality of shutter vanes, each providing for different limits of relative vertical movement. Accordingly, the shutter vane desired for each installation may be selected as desired by the orientation of the shutter wheel on assembly.

Other advantages and features of the invention will become more readily understood when taken in connection with the appended claims and attached drawings in which:

FIG. 1 is a sectional view of the sensor station mounting housing illustrating the relative positions of the radiant energy source, sensors and shutter wheel in the preferred embodiment of the encoder apparatus of the invention;

FIG. 2 is a perspective view of the preferred embodiment of the shutter wheel of the invention;

FIG. 3 is a top plan view of the sensor station mounting housing; and

FIG. 4 is an illustrative view of the sensor leg of the sensor station mounting housing as seen from the source mounting leg.

Although the principles of the invention are equally applicable to various applications, the invention is described hereinafter with particular reference to an encoder for generating electronic signals to indicate upper and lower limits of permissible relative vertical movement between a vehicular body and the axle housing or the like. As will be readily apparent, determination of such relative movement to such pre-determined limits may be useful in activating load-leveling apparatus to maintain the vehicular body substantially level regardless of load.

As illustrated in FIGS. 1 and 3 the preferred embodiment of the sensor station comprises a mounting housing generally indicated at 10 comprising a base 11 having a pair of spaced apart parallel leg members 12 and 13 extending therefrom in the same direction. First leg member 12 is hollow and adapted so that a conventional radiant energy emitting device 15 such as a plastic packaged gallium arsenide light emitting diode manufactured by Optron, Inc. of Carrollton, Tex. and sold under the designation OP-140 may be mounted therein. As illustrated in FIG. 1 the face of leg 12 opposite leg 13 is slotted at 14 so that radiant energy emitted by radiant energy source 15 may escape from first leg 12 and be directed toward second leg 13.

As illustrated in FIG. 1 a spring-like tongue 16 extends upwardly from the base 11 into the lower portion of slot 14. A dog 17 extending inwardly from tongue 16 engages an indexing groove 18 in the radiant energy source device 15 to rigidly secure the radiant energy source within first leg 12. The radiant energy source device may thus be inserted into the channel in first leg 12 and rigidly secured therein by tongue 16 so that the output lens 15a is aligned with the slot 14.

Second leg 13 extends from base 11 parallel to leg 12. Second leg 13 is similar to leg 12 but contains two hollow channels, each channel adapted to receive a radiant energy sensor device sensitive to the radiant energy emitted by the radiant energy source 15. As illustrated in FIG. 1 the inner portion 13a of leg 13 is shorter than the outer portion 13b thereof. A channel extending through the inner portion 13a is adapted to receive a first radiant energy sensor device 20 such as a plastic packaged silicon photodiode manufactured by Optron, Inc., Carrollton, Tex. and sold under the designation OP-555. The inner portion 13a has a vertically extending slot which narrows to define a first optical aperture 19 which permits light from radiant energy source 15 to impinge directly on the lens 20a of first sensor 20. A vertically extending tongue 21 extends upwardly within said slot to engage the indexing groove 22 in the first sensor 20.

The outer portion of leg 13b is identical to inner portion 13a except that outer portion 13b is extended to position the second sensor device 23 above and laterally displaced (to the left as shown in FIG. 1) from a first sensor 20. Likewise, the outer portion 13b has a vertically extending slot which narrows to define a second optical aperture 24 permitting radiant energy from radiant energy source 15 to impinge directly on the lens 23a of the second sensor 23. Likewise a vertically extending tongue 25 engages the indexing groove on the second sensor 23 to maintain the relative position of the sensor 23 within the housing.

The leads 26 extending from first sensor 20, leads 27 extending from second sensor 23 and leads 28 extending from the radiant energy source 15 all extend from the bottom of the base 11 so that the sensor station housing 10 may be readily plugged into a suitable receiving socket.

From the foregoing it will be observed that the output lens 15a, first aperture 19 and second aperture 24 lie in substantially the same vertical plane. Accordingly, radiant energy emitted by source 15 is directed from first leg 12 to second leg 13 and impinges directly on the lenses of sensors 20 and 23 exposed through apertures 19 and 24, respectively.

The leads 26, 27 and 28 are plugged into a suitable receptacle and interconnected to suitable electronic circuitry so that when the source 15 is illuminated radiant energy therefrom will be directed to both sensors 20 and 23. With appropriate circuitry, selective interruption of the optical paths between the source and each sensor may be used to generate digital signals which may determine the limit of relative vertical movement between two bodies.

In accordance with the preferred embodiment of the invention a shutter is provided to selectively interrupt the light path between the source 15 and sensor 20 and between source 15 and sensor 23. In the preferred embodiment the shutter comprises a shutter or encoder wheel as illustrated in FIG. 2. The encoder wheel comprises a circular disc 30 supported on a shaft 31. A plurality of flanges or shutter vanes 32, 33 and 34 depend vertically from the edge of the disc 30 and are adapted to selectively move in the gap between first and second legs 12 and 13 of the mounting housing 10 as illustrated in FIG. 1.

The shutter wheel 30 is mounted in spaced relationship with the mounting housing 10 and the shaft 31 mechanically linked to an axle housing or the like so that relative vertical movement between the axle housing and the vehicular body is translated to rotational movement of the disc 30. In the embodiment illustrated, the shutter is divided into three depending flange segments 32, 33 and 34. As illustrated in FIG. 1, the disc 30 is mounted parallel to base 11 of the mounting housing 10 so that flange 32 depends between the legs 12 and 13 of the mounting housing 10. As more clearly illustrated in FIG. 2, the leading edge of the flange 32 is stepped so that the upper half of flange 32 enters the gap between legs 12 and 13 before the lower half of the flange. The disc 30 is positioned so that the upper half of the flange interrupts the optical path between emitter 15 and sensor 23 and the lower half of the flange interrupts the optical path between emitter 15 and sensor 20. Accordingly, as the disc is rotated the path between emitter 15 and sensor 23 is interrupted before the path between emitter 15 and sensor 20.

Referring to FIG. 4 it will be observed that as the disc 30 rotates the top leading edge 41 of flange 32 passes over aperture 24 and the optical path between emitter 15 and second sensor 23 is interrupted. Since the aperture 24 is relatively narrow and preferably centered over the central portion of the lens 23a of the sensor device 23, relatively sharp cut-off may be accomplished when the leading edge 41 of the shutter passes over the aperture.

The horizontal distance between the leading edge 41 of the top half of shutter flange 32 and the leading edge 42 of the bottom half of shutter flange 32 may be any distance required. In the particular embodiment described, leading edge 41 of the shutter 32 is used to determine the normal level position of the vehicular body. Thus, the housing and shutter are adjusted so that under normal loading conditions leading edge 41 of shutter 32 is aligned with one edge of aperture 24. The leading edge 42 of the lower half of the shutter lags behind the leading edge of the top half by a fixed distance and cut-off of the signal between the emitter 15 and the first sensor 20 will occur when the disc 30 is rotated sufficiently to cause the bottom half of the shutter 32 to obstruct first aperture 19. The extent of rotation depends, of course, on the mechanical linkage used. In most linkage arrangements, 3° of rotation is used. The 3° of rotation is therefore equivalent to the permissible movement between upper and lower limit before the load compensation system is activated.

It will be readily recognized that the alignment necessary to determine the upper limit automatically determines lower limit when the apertures 19 and 24 are vertically aligned and a single emitter source is used as described herein. The leading edge of the lower half of shutter 32 lags a fixed distance behind the top half so that the alignment of the top half automatically causes alignment of the bottom half.

As illustrated in FIG. 2 the disc 30 may be provided with a plurality of flanges. In the embodiment illustrated the disc has three flanges. On flange 32 the bottom half of the leading edge trails the top half thereof by 3°. On flange 33 the bottom half of the flange trails the top half by 4° and, likewise, on flange 34 the leading edge of the bottom half trails the top half by 5°. Accordingly, the separation between upper and lower limits can be varied as desired by selectively positioning any of the shutter flanges in the gap between the legs of the mounting housing.

In order to obtain relatively sharp signal cut-off, it is desirable that apertures 19 and 24 be relatively narrow and centered over the lenses 20a and 23a, respectively, as illustrated in FIG. 4. However, as noted above, it is desirable that the sensor station housing, because of the harsh environment in which it is used, be protected as much as possible. Accordingly, such housings are generally assembled and then a liquid potting compound such as an epoxy resin applied to the base of the housing to encapsulate the base 11 of the housing and the receptacle into which it is inserted. Application of the liquid potting material, however, frequently causes problems since the liquid material tends to rise by capillary action from the base into any narrow slot. If such wicking occurs, the apertures 19 and 24 may become blocked, thus rendering the assembly unusable.

In accordance with the present invention, wicking of the liquid potting material is eliminated by forming a widened slot 35 between aperture 19 and the base 11 and a similar widened slot 36 between aperture 24 and the base. The width of slots 35 and 36 is substantially greater than the width of the apertures 19 and 24, respectively. Accordingly, since the slots are relatively wide, the potting material will not rise by wicking action therein. By forming the widened slots below the apertures, relatively narrow apertures may be formed in the sensor mounting housing so that sharp signal cut-off edges may be obtained. The widened slots therefore act as a means to prevent blockage of the narrow apertures by wicking of the potting material.

From the foregoing it will be observed that utilizing the principles of the invention an optical encoder apparatus may be fabricated which provides two channels of digital information using a single radiant energy source and two radiant energy sensors. Accordingly, a cost saving is realized by the elimination of a second radiant energy source. Furthermore, since a single shutter vane having spaced leading edges which selectively interrupt the path between the radiant energy source and each of the sensors is used, mechanical alignment of one leading edge provides automatic alignment of the second vane edge, thus eliminating a substantial portion of the mechanical alignment difficulties encountered upon installation of conventional encoder devices.

The sensor station housing may be readily formed from molded plastic. By formation of widened slots in the face of the sensor leg, wicking action of the potting material is prevented. Accordingly, relatively narrow apertures may be formed over the radiant energy sensor to permit sharp optical signal cut-off.

By utilizing a shutter wheel having a plurality of shutter vanes with varied space between the leading edge of the top portion and the leading edge of the bottom portion, the shutter wheels may be mass produced and the rotational spacing between cut-off of one sensor and a cut-off of the second sensor may be selected as desired on installation by simply selecting the shutter vane having the desired spacing.

While the invention has been described with particular reference to an optical encoder apparatus for use in controlling the upper and lower limits of relative movement between an axle housing and a vehicular body, it will be readily recognized that the invention is not so limited. The principles of the invention may be adapted, of course, to various other arrangements for similar uses or other digital encoding applications. Likewise, it is not necessary that the shutter vanes depend from a circular disc. Instead, interruption of the respective light paths may be caused by individually activated shutter vanes which are moved to indicate other functions or in response to other stimuli.

It is to be understood that although the invention has been described with particular reference to specific embodiments thereof, the forms of the invention shown and described in detail are to be taken as preferred embodiments of same, and that various changes and modifications may be resorted to without departing from the spirit and scope of the invention as defined by the appended claims.

What is claimed:

1. Encoder apparatus comprising
   (a) a radiant energy source,
   (b) first and second radiant energy sensors responsive to the radiant energy emitted by said radiant energy source, and
   (c) mounting means for supporting said sensors in spaced relation with said radiant energy source, said mounting means comprising
      (i) a base member with substantially parallel first and second hollow spaced apart leg members extending therefrom in the same direction,
      (ii) means for supporting said radiant energy source within said first leg member to direct radiant energy toward said second leg member.
      (iii) first and second optical apertures in said second leg member opposite said first leg member, and
      (iv) means for supporting said first and second radiant energy sensors within said second leg member substantially opposite said radiant energy source whereby radiant energy emitted by said radiant energy source may pass through said first and second optical apertures and strike said first and second radiant energy sensors, respectively.

2. Encoder apparatus as defined in claim 1 wherein said first optical aperture, said second optical aperture and said radiant energy source lie in substantially the same plane.

3. Encoder apparatus as defined in claim 1 wherein the face of said second leg member between said optical apertures and said base includes a slot substantially wider than said apertures.

4. Encoder apparatus as defined in claim 1 including shutter means selectively moveable between said first leg member and said second leg member to selectively interrupt the optical paths between said radiant energy source and said first and second optical apertures.

5. Encoder apparatus as defined in claim 4 wherein said shutter means comprises
   (a) a disc rotatable about an axis substantially parallel with the longitudinal axes of said first and second leg members, and
   (b) a shutter opaque to the radiant energy emitted by said radiant energy source depending from said disc and adapted to pass between said first and second leg members when said disc is rotated about its axis, the edge of said shutter passing between said leg members having at least two distinct edges substantially parallel with the axis of said disc, the first edge aligned to pass between said radiant energy source and said first radiant energy sensor and the second edge aligned to pass between said radiant energy source and said second radiant energy sensor.

6. Encoder apparatus as defined in claim 5 wherein said first edge trails said second edge by approximately 3° of rotation of said disc.

7. Encoder apparatus as defined in claim 5 wherein said disc includes at least first and second shutters depending therefrom, the first edge of the first shutter trailing the second edge of said shutter by at least 3° of rotation, and the first edge of the second shutter trailing the second edge of said second shutter by at least 4° of rotation.

* * * * *